United States Patent
Allen et al.

(10) Patent No.: US 7,505,449 B2
(45) Date of Patent: Mar. 17, 2009

(54) QUEUE MANAGEMENT FOR CONNECTIVITY QUALITY AWARENESS FOR INTELLIGENT DEVICE SYNCHRONIZATION

(75) Inventors: Timothy E. Allen, Durham, NC (US); Christopher J. Paul, Durham, NC (US); Richard Redpath, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 522 days.

(21) Appl. No.: 10/963,105

(22) Filed: Oct. 12, 2004

(65) Prior Publication Data

US 2006/0077949 A1    Apr. 13, 2006

(51) Int. Cl.
*H04J 3/06* (2006.01)

(52) U.S. Cl. .................. 370/350; 370/503; 455/502
(58) Field of Classification Search ................ 370/350, 370/310, 310.1, 310.2, 503; 455/502
See application file for complete search history.

(56) References Cited

U.S. PATENT DOCUMENTS

| | | | |
|---|---|---|---|
| 5,537,684 A | 7/1996 | Cassidy et al. | |
| 5,974,327 A | 10/1999 | Agrawal et al. | |
| 6,072,784 A | 6/2000 | Agrawal et al. | |
| 6,108,316 A | 8/2000 | Agrawal et al. | |
| 6,205,486 B1 * | 3/2001 | Wei et al. | 709/233 |
| 6,359,901 B1 * | 3/2002 | Todd et al. | 370/465 |
| 6,658,485 B1 | 12/2003 | Baber et al. | |
| 6,801,512 B1 * | 10/2004 | Cudak et al. | 370/332 |
| 2003/0003964 A1 | 1/2003 | Wroblewski | |

FOREIGN PATENT DOCUMENTS

WO    WO 01/65876 A1    9/2001

* cited by examiner

*Primary Examiner*—Quochien B Vuong
(74) *Attorney, Agent, or Firm*—Gerald R. Woods, Esq.; Steven M. Greenberg, Esq.; Carey Rodriguez Greenberg & Paul LLP

(57) ABSTRACT

A method, system and apparatus for synchronization queue management. A synchronization queue management system can include a connection manager programmed to establish a synchronization link between a host pervasive device and a synchronization partner platform. The system further can include a link quality analysis service programmed to indicate a link quality for an established synchronization link. Finally, the system can include a synchronization application coupled to the connection manager and the link quality analysis service. The synchronization application can be configured to synchronize data in a synchronization queue in the host pervasive device with the synchronization partner platform over the established synchronization link. The synchronization application further can be configured to manage the synchronization queue based upon a link quality indicated by the link quality analysis service. Preferably, the link quality can be a throughput measurement or a usage cost measurement.

20 Claims, 2 Drawing Sheets

QUEUE MANAGEMENT FOR CONNECTIVITY QUALITY AWARENESS FOR INTELLIGENT DEVICE SYNCHRONIZATION

BACKGROUND OF THE INVENTION

1. Statement of the Technical Field

The present invention relates to the field of pervasive computing and more particularly to mobile device synchronization for pervasive computing devices.

2. Description of the Related Art

Personal computers no longer are the most common vehicle through which users connect to data communications networks like the Internet. Now that computing can be viewed as being truly everywhere, computer scientists and information technologists have begun to rethink those services that can be provided to meet the needs of mobile computing users. In consequence, the study of pervasive computing has resulted in substantial innovation in the field of network connectivity. "Pervasive computing" has been defined as referring to any non-constrained computing device not physically tethered to a data communications network. Thus, pervasive computing devices refer not only to computers wirelessly linked to networks, but also to handheld computing devices, wearable systems, embedded computing systems and the like.

Most pervasive devices, including notebook computers, handheld computers and even data enabled cellular telephones permit data synchronization with a different computing device, for example a desktop computer. Data synchronization refers to the harmonization of data between two data sources such that the data contained in each data source can be reconciled notwithstanding changes to the data applied in either or both of the data sources. Modern pervasive devices provide for a synchronization process through a direct cable link, a modem link, or a network link to a host computing device. Wireless pervasive devices further can accommodate synchronization over infrared or radio frequency links.

Direct cable links between a pervasive device and a host computing device often can provide the quickest means of performing a data synchronization. In the case of a direct cable link, the link can be monopolized by the two devices in performing the data synchronization and the transmission distance between the devices can be minimized. By comparison, when performing a data synchronization over a more restrictive medium, such as a wireless, radio frequency media, data synchronization can be a slow and error prone process. The difficulties in performing data synchronization over a challenged medium can become compounded where the type of data to be synchronized can be large in size such as a large e-mail attachment or graphic or audio data.

The quality of a connection between pervasive device and host device often can be determinative when choosing whether or not to engage in a data synchronization session. As the quality of a connection deteriorates, it can be advisable to avoid data synchronization until the quality of the connection improves. Yet, some portions of the data synchronization process can execute seamlessly despite a poor connection. In particular, small data items can synchronize with little risk, even over a shaky wireless link. By comparison, a very large data item can enjoy little likelihood of speedy success in the face of the same shaky wireless link.

A similar circumstance can arise where the cost of a connection can vary. In this regard, some wireless connections do not require the payment of airtime fees for usage, while other wireless connections may involve substantial per minute charges. As such, one would prefer not to perform data synchronization for large, time consuming files where airtime fees can be incurred. Yet, the transmission of small, time insignificant files can be transmitted cost effectively, even over a link involving airtime charges. Accordingly, as the data synchronization process does not account for the nature of the connection, the presence of large data items when combined with a poor or expensive connection can prejudice the ability to synchronize small data items over the same poor or expensive connection.

SUMMARY OF THE INVENTION

The present invention addresses the deficiencies of the art in respect to data synchronization for pervasive devices and provides a novel and non-obvious method, system and apparatus for the user enabled queue management for connectivity quality awareness for intelligent device synchronization. In this regard, a synchronization queue management method can include establishing a synchronization link for synchronizing data in a synchronization queue; analyzing link quality for the synchronization link; and, selectively managing data items in the synchronization queue based upon the analyzed link quality. The analyzing step can include determining a throughput measurement for the synchronization link. Also, the analyzing step can include determining a usage cost measurement for the synchronization link.

The managing step can include the step of ordering the data items in the synchronization queue to prioritize data items determined to be more effectively synchronized over the synchronization link despite the analyzed link quality. For instance, the managing step can include ordering the data items in the synchronization queue to prioritize smaller data items able to be more effectively synchronized over a slow synchronization link as compared to larger data items. Similarly, the managing step can include ordering the data items in the synchronization queue to prioritize smaller data items able to be more cost effectively synchronized over a slow synchronization link as compared to larger data items. Notably, the managing step can include the step of ordering the data items according to a specified state of urgency for each data item to ensure that more urgent data items are synchronized first.

A synchronization queue management system can include a connection manager programmed to establish a synchronization link between a host pervasive device and a synchronization partner platform. The system further can include a link quality analysis service programmed to indicate a link quality for an established synchronization link. Finally, the system can include a synchronization application coupled to the connection manager and the link quality analysis service. The synchronization application can be configured to synchronize data in a synchronization queue in the host pervasive device with the synchronization partner platform over the established synchronization link. The synchronization application further can be configured to manage the synchronization queue based upon a link quality indicated by the link quality analysis service. Preferably, the link quality can be a throughput measurement or a usage cost measurement.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for pervasive device queue management based upon synchronization connection quality. In accordance with the present invention, the quality of a synchronization connection between a pervasive device and a synchronization companion device can be analyzed. The connection quality can include as an example, throughput considerations, reliability considerations and connectivity cost considerations, to name a few. Where the analysis suggests a limitation on the synchronization of portions of the data queued for synchronization, the queued data can be managed such that the synchronization of certain portions of the queued data can be selectively prioritized for synchronization over others. In contrast, where the analysis suggests no need for a limitation on the synchronization of portions of the queued data, synchronization can proceed according to a default methodology. Finally, individual portions of the queued data can be marked urgent such that the marked portions can be selectively prioritized for synchronization—especially where the connection quality is deemed limiting.

Figure 1:
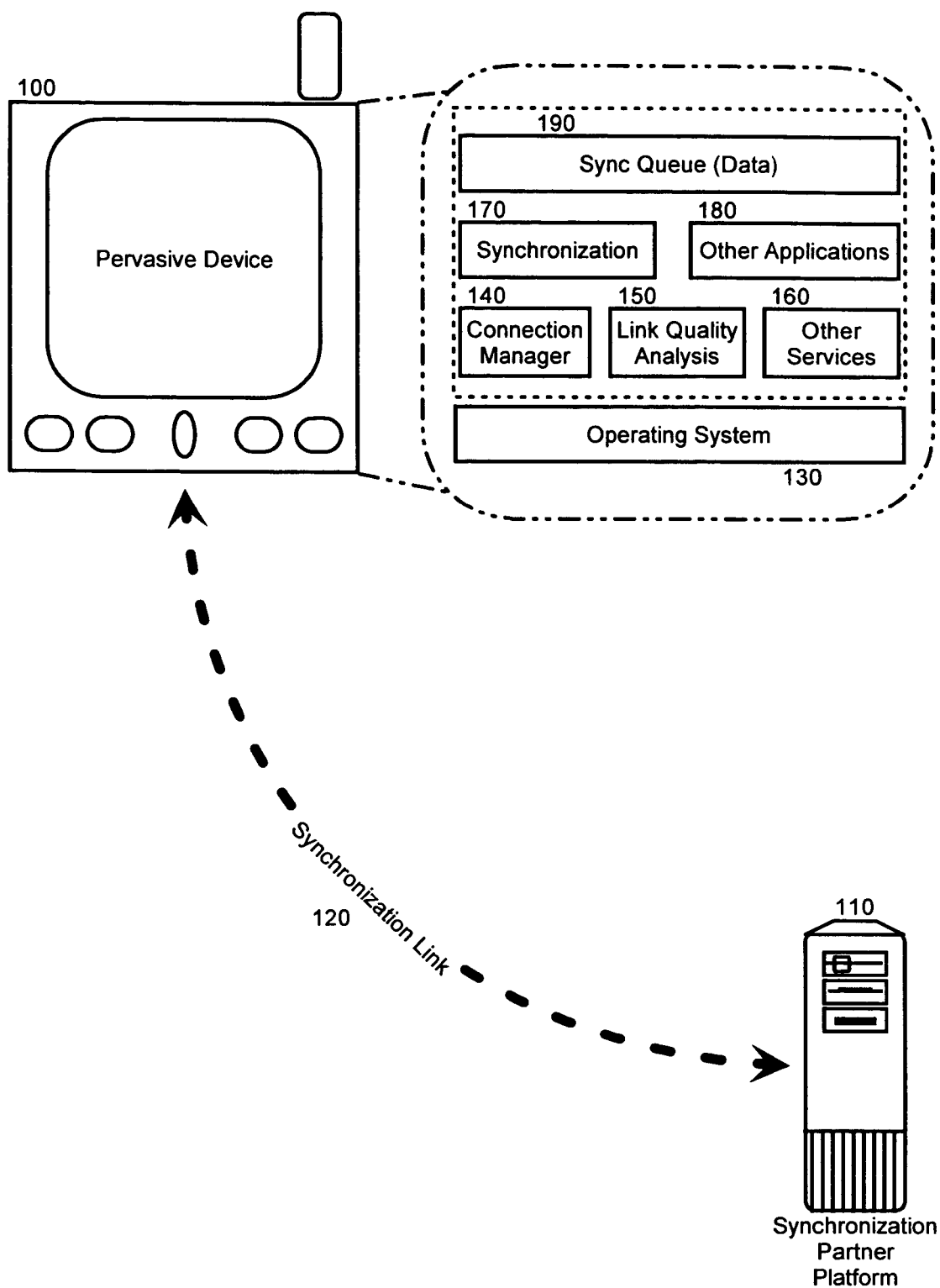
FIG. 1 is a schematic diagram illustrating a system, method and apparatus for pervasive device queue management based upon synchronization connection quality; and, FIG. 2 is a flow chart illustrating a process for pervasive device queue management based upon synchronization connection quality.

In more particular illustration, FIG. 1 is a schematic diagram illustrating a system, method and apparatus for pervasive device queue management based upon synchronization connection quality. As shown in FIG. 1, a pervasive device 100 can be communicatively coupled to a synchronization partner platform 110 by way of a synchronization link 120. Specifically, the synchronization link 120 can be established at the request of either or both of the pervasive device 100 and the synchronization partner platform 110. Once established, the synchronization link 120 can carry synchronization information between the pervasive device 100 and the synchronization partner platform 110 to reconcile data in both the pervasive device 100 and the synchronization partner platform 110.

The pervasive device 100 can include an operating system 130 which can support a number of device services. Notably, the device services can include a connection manager 140 and a link quality analysis service 150, among other services 160. Additionally, the operating system 130 can manage the operation of one or more applications, including a synchronization application 170 among other applications 180. During a synchronization operation, the connection manager 140 can establish the synchronization link 120 with the synchronization partner platform 110 while the synchronization application 170 can manage the synchronization of queued data 190 with data disposed in the synchronization partner platform 110 across the synchronization link 120.

In operation, the link quality analysis service 150 can monitor the synchronization link 120 once established to identify pertinent characteristics of the synchronization link 120. Pertinent characteristics can include the data throughput which can be supported by the synchronization link 120, the error rate associated with transmitting data across the synchronization link 120, and the cost of utilizing the synchronization link 120, to name only a few. The synchronization application 170 in turn can utilize the pertinent characteristics identified by the link quality analysis service 150 to manage the data disposed in the synchronization queue 190 during a synchronization operation.

More specifically, as first example, to the extent the link quality analysis service 150 indicates that the throughput associated with the synchronization link 120 cannot support the efficient transfer of large data files, the data in the synchronization queue 190 can be re-arranged such that smaller data files are transferred first and optionally that no large data files are transferred. Also, the synchronization queue 190 can be sorted such that certain data items marked urgent are prioritized over other unmarked data item. Conversely, where the link quality analysis service 150 indicates that the throughput associated with the synchronization link 120 can amply support the transfer of any sized data file, the synchronization of all data in the synchronization queue can proceed normally without limitation. Of course, where the link quality analysis service 150 indicates that the throughput associated with the synchronization link 120 cannot adequately support the synchronization of the data in the synchronization queue 190, the synchronization process can be deferred pending a higher quality connection.

As another example, to the extent the link quality analysis service 150 indicates that the usage cost associated with the synchronization link 120 cannot support the cost effective transfer of large data files, the data in the synchronization queue 190 can be re-arranged such that smaller data files are transferred first and optionally that no large data files are transferred. Conversely, where the link quality analysis service 150 indicates that the usage cost associated with the synchronization link 120 can amply support the transfer of any sized data file cost-effectively, the synchronization of all data in the synchronization queue can proceed normally without limitation. The skilled artisan will recognize other determinative scenarios for managing the synchronization of data in the synchronization queue 190 based upon the quality of the synchronization link 120 measured by the link quality analysis service 150 and the foregoing examples are provided only for purposes of illustration.

Figure 2:
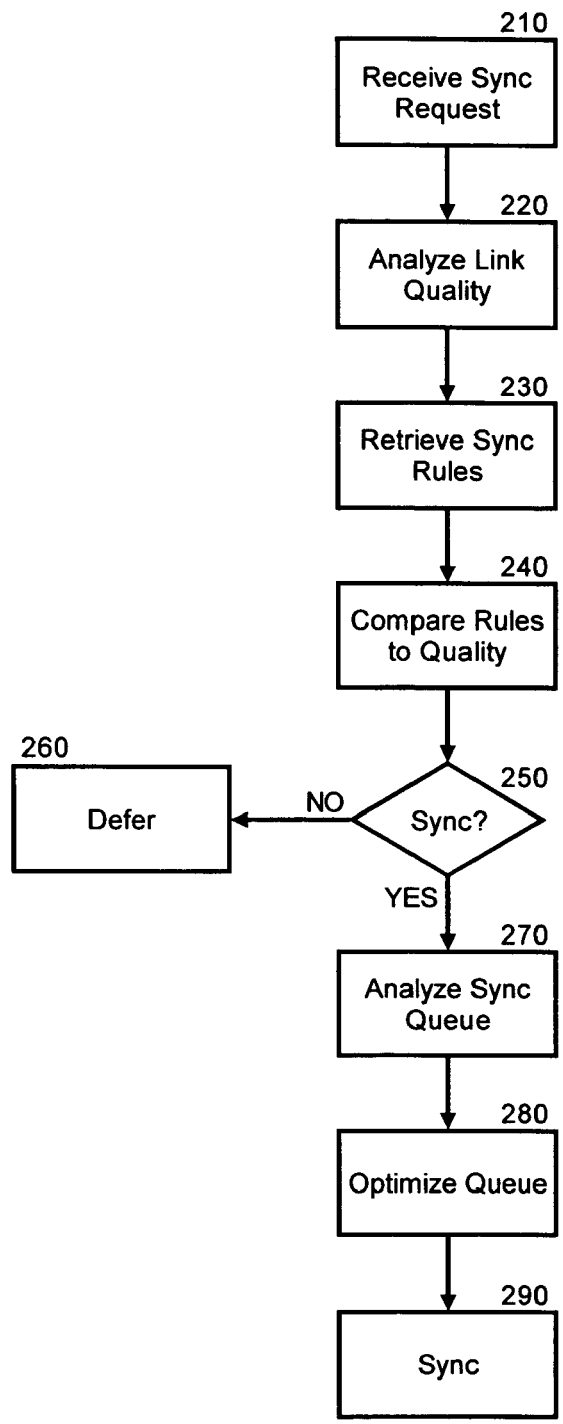

In further illustration of the methodology of the present invention, FIG. 2 is a flow chart illustrating a process for pervasive device queue management based upon synchronization connection quality. Beginning in block 210, a synchronization request can be received and processed In block 220, the synchronization link designated for use to satisfy the synchronization request can be analyzed to determine link quality. Also, in block 230 one or more quality rules or criteria can be retrieved. The rules can specify under which link quality conditions the synchronization process is to proceed and under which link quality conditions the synchronization process is to be deferred. The rules also can specify preferences for ordering data in a synchronization queue to ensure that desired data items are synchronized before other data items in the queue.

In block 240, the synchronization rules can be applied to the analyzed link quality to determine how best to manage the synchronization queue. In decision block 250, if the comparison indicates that the synchronization is to be deferred in block 260 the entire synchronization process can be deferred until a higher quality link can be established. Otherwise, in block 270 the synchronization queue can be analyzed and the queue can be optimized in block 280 according to the applicable synchronization rules. Optionally, an estimated synchronization time can be produced and the end user can be prompted with the estimate to afford the end user the opportunity to defer synchronization. Finally, in block 290 the synchronization process can commence such that the data items in the synchronization queue can be harmonized with that of the linked synchronization partner.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods, optionally with software or hardware plug-ins, or configuration files for rules.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A synchronization queue management method comprising the steps of:
    establishing a synchronization link for synchronizing data in a synchronization queue;
    analyzing link quality for said synchronization link; and,
    selectively managing data items in said synchronization queue based upon said analyzed link quality.

2. The method of claim 1, wherein said analyzing step comprises the step of determining a throughput measurement for said synchronization link.

3. The method of claim 2, wherein said managing step comprises the step of ordering said data items in said synchronization queue to prioritize smaller data items able to be more effectively synchronized over a slow synchronization link as compared to larger data items.

4. The method of claim 1, wherein said analyzing step comprises the step of determining a usage cost measurement for said synchronization link.

5. The method of claim 4, wherein said managing step comprises the step of ordering said data items in said synchronization queue to prioritize smaller data items able to be more cost effectively synchronized over a slow synchronization link as compared to larger data items.

6. The method of claim 1, wherein said managing step comprises the step of ordering said data items in said synchronization queue to prioritize data items determined to be more effectively synchronized over said synchronization link despite said analyzed link quality.

7. The method of claim 1, further comprising the steps of:
    determining an estimated synchronization time for a data item in said synchronization queue; and,
    generating a prompt with said estimated synchronization time.

8. The method of claim 1, wherein said managing step comprises the step of ordering said data items in said synchronization queue to prioritize data items marked urgent.

9. The method of claim 1, further comprising the step of performing deferring synchronization where said analyzed link quality merits avoidance of synchronization.

10. A synchronization queue management system comprising:
    a connection manager programmed to establish a synchronization link between a host pervasive device and a synchronization partner platform;
    a link quality analysis service programmed to indicate a link quality for an established synchronization link; and,
    a synchronization application coupled to said connection manager and said link quality analysis service, said synchronization application having a configuration for synchronizing data in a synchronization queue in said host pervasive device with said synchronization partner platform over said established synchronization link, said synchronization application having a further configuration for managing said synchronization queue based upon a link quality indicated by said link quality analysis service.

11. The system of claim 10, wherein said link quality comprises at least one of a throughput measurement and a usage cost measurement.

12. A machine readable storage having stored thereon a computer program for synchronization queue management, the computer program comprising a routine set of instructions which when executed by a machine causes the machine to perform the steps of:
    establishing a synchronization link for synchronizing data in a synchronization queue;
    analyzing link quality for said synchronization link; and,
    selectively managing data items in said synchronization queue based upon said analyzed link quality.

13. The machine readable storage of claim 12, wherein said analyzing step comprises the step of determining a throughput measurement for said synchronization link.

14. The machine readable storage of claim 13, wherein said managing step comprises the step of ordering said data items in said synchronization queue to prioritize smaller data items able to be more effectively synchronized over a slow synchronization link as compared to larger data items.

15. The machine readable storage of claim 12, wherein said analyzing step comprises the step of determining a usage cost measurement for said synchronization link.

16. The machine readable storage of claim 15, wherein said managing step comprises the step of ordering said data items in said synchronization queue to prioritize smaller data items able to be more cost effectively synchronized over a slow synchronization link as compared to larger data items.

17. The machine readable storage of claim 12, wherein said managing step comprises the step of ordering said data items in said synchronization queue to prioritize data items determined to be more effectively synchronized over said synchronization link despite said analyzed link quality.

18. The machine readable storage of claim 12, further comprising an additional set of instructions for further causing the machine to perform the steps of:
- determining an estimated synchronization time for a data item in said synchronization queue; and,
- generating a prompt with said estimated synchronization time.

19. The machine readable storage of claim 12, wherein said managing step comprises the step of ordering said data items in said synchronization queue to prioritize data items marked urgent.

20. The machine readable storage of claim 12, further comprising an additional set of instructions for further causing the machine to perform the step of performing deferring synchronization where said analyzed link quality merits avoidance of synchronization.

* * * * *